United States Patent [19]

Lowther et al.

[11] 4,125,885
[45] Nov. 14, 1978

[54] CONTROL APPARATUS

[75] Inventors: Leslie Lowther; Tadeusz J. Pawlak, both of Leicester, England

[73] Assignee: Towmotor Corporation, Mentor, Ohio

[21] Appl. No.: 835,260

[22] Filed: Sep. 21, 1977

[30] Foreign Application Priority Data

May 19, 1977 [GB] United Kingdom ............... 21158/77

[51] Int. Cl.² ............................................... H02H 7/09
[52] U.S. Cl. .................................... 361/114; 307/115; 361/29; 361/92; 361/189; 361/196
[58] Field of Search .................. 361/23, 28, 29, 88, 361/89, 92, 33, 2, 3, 114, 115, 189, 187, 190, 193, 194, 195, 196; 307/10 BP, 115, 130, 142, 293, 252 R; 320/32, 33, 34, 39, 40

[56] References Cited

U.S. PATENT DOCUMENTS

| 3,475,061 | 10/1969 | Steinkamp et al. ................ 361/89 X |
| 3,958,164 | 5/1976 | Hess .................................... 361/33 X |
| 4,005,344 | 1/1977 | Gaind et al. ............................ 361/92 |
| 4,040,117 | 8/1977 | Houser .................................... 361/33 |
| 4,064,547 | 12/1977 | Zagwyn ........................... 361/189 X |

Primary Examiner—Patrick R. Salce
Attorney, Agent, or Firm—John L. James

[57] ABSTRACT

Control apparatus is provided for a contactor which has a coil and at least one pair of contacts movable from an open position to a closed position in response to energizing the coil. The control apparatus includes apparatus for temporarily and permanently energizing the coil and switching apparatus for controllably energizing the coil.

7 Claims, 1 Drawing Figure

U.S. Patent    Nov. 14, 1978    4,125,885
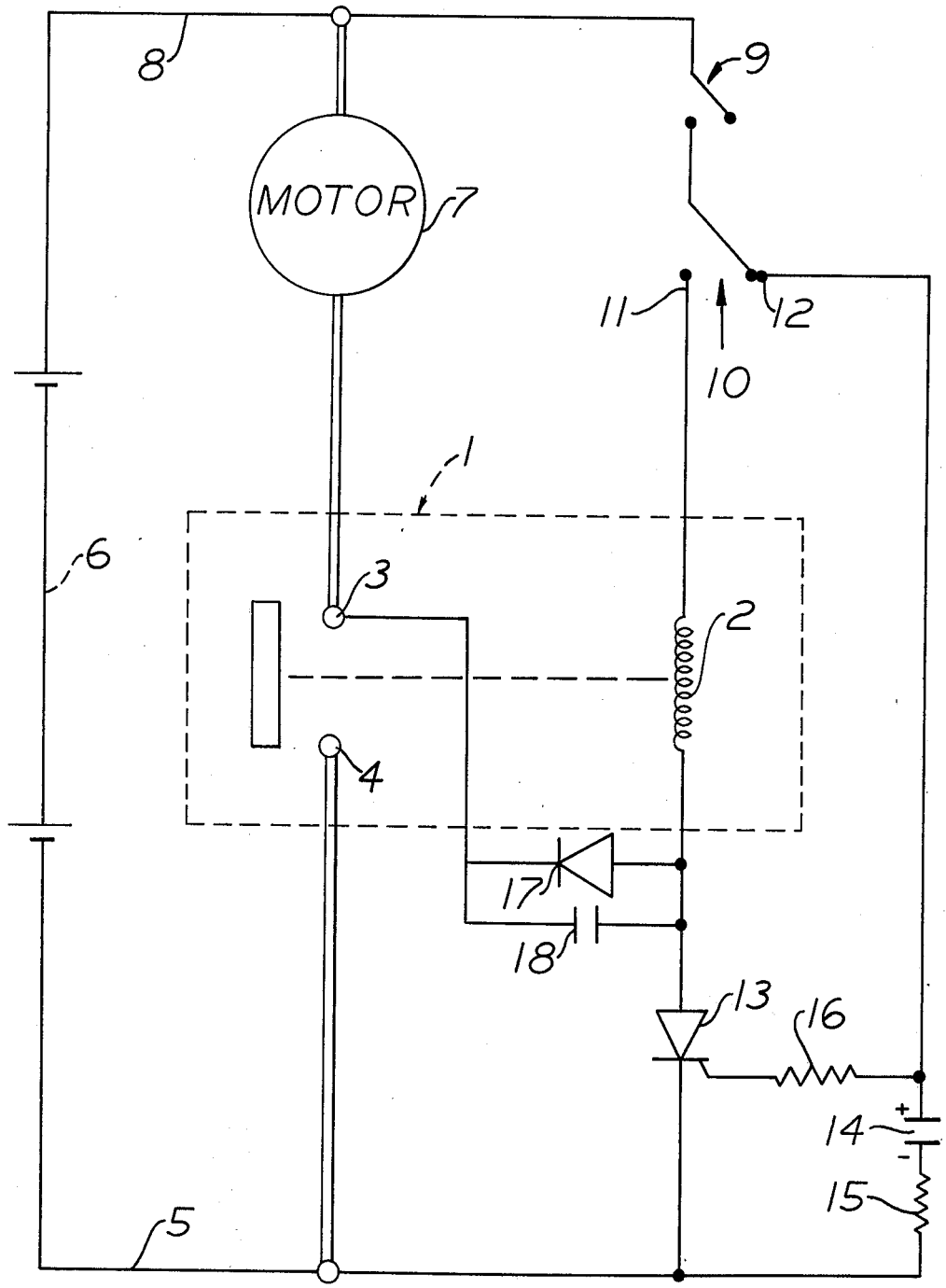

4,125,885

CONTROL APPARATUS

BACKGROUND OF THE INVENTION

Contactors, such as electro-magnetically operated contactors for example, typically have one or more pairs of contacts and a coil which is energized to close the contacts. Such contactors are designed to have a nominal working voltage for the solenoid coil, but will pull in at a somewhat lower applied voltage. They usually operate satisfactorily with an applied voltage somewhat greater than the rated voltage. If the voltage applied to the coil is reduced after the contactor has pulled in, the contacts will remain closed until the applied voltage reaches a drop-out voltage which is appreciably lower than the pull-in voltage.

Such a contactor may be used to switch the supply from a battery to a motor, for example a hydraulic pump motor, of a battery-operated vehicle, such as fork-lift truck. As the battery becomes discharged during normal use of the vehicle, the terminal voltage decreases, and when a heavy current demand is applied to the battery, for example on starting the motor under heavy load conditions, the terminal voltage can fall to a very low value.

Since the contactor coil supply is also taken from the battery, this low terminal voltage on heavy load may be insufficient to hold in the contactor. Hence, when the load is applied, the contactor will begin to drop out, but, as the contacts open, the load will be removed from the battery and the terminal voltage will immediately rise. This will cause the contactor to pull in again, once again applying the load to the battery. This action will be repeated continuously. If the contacts continue to open and close on the high direct current load in this manner, either of two extremely serious situations can arise. The contacts may weld together, in which case the motor will become uncontrollable. On the other hand, if they continue to open and close cyclically, the contacts will burn away due to the arcing which takes place, and destruction of the contactor can result.

It is desirable to avoid this cyclic opening and closing of the contacts of an electro-magnetic contactor.

SUMMARY OF THE INVENTION

The present invention is directed to overcoming one or more of the problems set forth above.

According to the present invention, control apparatus for a contactor having a coil and at least one pair of contacts movable from an open position to a closed position in response to energizing the coil comprises auxiliary means for temporarily energizing the coil and main means for permanently energizing the coil. A switching means for controllably energizing the coil is changeable between first operating condition at which the switching means is connected to auxiliary means and a second operating condition at which the switching is connected to the coil. The coil is energized only in response to the switching means changing from the first operating condition to the second operating condition.

BRIEF DESCRIPTION OF THE DRAWING

The drawing is a schematic illustration of a contactor incorporating the present invention.

DETAILED DESCRIPTION

Referring to the drawing, a contactor has a coil 2, preferably a solenoid, and contacts 3, 4 which are closed by energization of the coil 2.

The contact 4 is connected to a negative line 5 from a power source, preferably a battery 6. A motor 7 is connected between the contact 3 and a positive line 8 from the battery 6. Closure of the contacts 3, 4 therefore causes operation of the motor 7, such as the drive motor of a hydraulic pump or a fork lift truck, for example.

When closed, a key switch 9 preferably connects a switch 10 to the positive line 8, so that in a second position of the switch 10 a switch terminal 11 is connected to the line 8, and in a first position a terminal 12 is connected to the line.

The coil 2 is connected between the terminal 11 and a switching device, preferably the annode of a thyristor 13. The cathode of the thyristor is connected to the negative line 5.

A capacitor 14 is connected between the terminal 12 and one end of a resistor 15, the other end of which is connected to the line 5. The gate of the thyristor 13 is connected via a resistor 16 to the junction of the capacitor 14 and the terminal 12.

The junction between the coil 12 and the anode of the thyristor 13 is connected, via a diode 17 and a commutating capacitor 18 in parallel, to the contact 3 of the contactor 1.

In operation, the switch 10 is set in the first position and the key switch 9 is closed, so that the capacitor 14 is charged from the line 8. The potential of the gate electrode of the thyristor 13 increases substantially to the potential of the line 8, but the thyristor cannot conduct through the coil 2 because there is no connection between the coil and the line 8. However, the capacitor 18 charges so that its left and right hand ends 18L, 18R are substantially at the positive and negative line potentials, respectively.

To start the motor 7, the switch 10 is moved to the second position and the coil 2 is connected to the line 8, and the anode of the thyristor 13 becomes positive with respect to its cathode. At the instant of changing the switch 10, the gate of the thyristor is held positive by the capacitor 14, and the thyristor temporarily conducts through the coil 2, and energizes the coil 2. The contacts 3, 4 close and energize the motor 7 or other device to be controlled by the contactor 1. The thyristor 13, capacitor 14 and resistor 15, 16 form a temporary, auxiliary circuit means for energizing the contactor coil 2.

Since the capacitor 14 has been disconnected from the line 8 by changing of the switch 10, the capacitor 14 discharges through the resistor 16 and the gate/cathode circuit of the thyristor 13. The discharge time constant of the capacitor circuit is chosen so that the gate/cathode voltage remains above the firing level until the thyristor 13 is fired, but falls below the firing level by the time the contacts 3, 4 have closed.

As previously stated, the commutating capacitor 18 will have charged up during the time that the switch 10 was in the first position. By closing the contacts 3, 4, the positive, left-hand end of the capacitor 18 is connected to the negative line 5, and the right-hand end of the capacitor 18 therefore instantaneously becomes negative with respect to the line 5. Hence, the anode of the thyristor 13 is driven negative with respect to its cathode and the thyristor 13 is switched off.

However, on closing the contacts 3, 4 a new, main path for energization of the coil 2 exists via the diode 17, the contacts 3, 4 and the line 5, so that the contactor continues to hold in even though the thyristor 13 has switched off.

When, on closing of the contacts 3, 4 the battery voltage is pulled down, by the motor load, to a level at which the current through the coil 2 is insufficient to hold the coil energized, the contacts 3, 4 will open and interrupt the coil energizing current. Since the thyristor 13 has been switched off and there is no gate signal to cause it to fire again, the contactor 1 will not pull in again, even though the battery voltage may have recovered on disconnection of the motor 7. There is therefore no cyclic closing and opening of the contacts 3, 4.

In order to cause reclosure of the contacts 3, 4 it is necessary to take the positive steps of resetting the switch 10 back to the first position so that a positive gate signal is applied to the thyristor 13 and the capacitor 14 is recharged, and then to move the switch 10 back again to the second position to energize the coil 2. If this is done with the battery 6 still in the low charge state, the contactor 1 will again fail to hold in, and this will act as an indication to the operator that the battery condition is low.

Other aspects, objects and advantages will become apparent from a study of the specification, drawing and appended claims.

The embodiments of the invention in which an exclusive property or privilege is claimed are defined as follows:

1. Control apparatus for a contactor having a coil and at least one pair of contacts movable from an open position to a closed position in response to energizing the coil, comprising:
    auxiliary means for temporarily energizing said contactor coil;
    switching means for controllably energizing said coil, said switching means being changeable between a first operating condition at which the switching means is connected to said auxiliary means and a second operating condition at which the switching means is connected to said contactor coil, said coil being energized only in response to the switching means changing from the first operating condition to the second operating condition; and
    main means for permanently energizing said contactor coil, said main means maintaining said contactor coil energized only in response to said contacts being closed while said switching means is in the second operating condition.

2. An apparatus as set forth in claim 1, wherein the auxiliary means comprises a thyristor connected in series with the coil; and gating means for applying a gate signal to the thyristor when the switching means is in the first condition and maintaining the gate signal for a time sufficient for conduction of the thyristor through the coil during changing of the switching means from the first operating condition to the second operating condition.

3. An apparatus, as set forth in claim 2, wherein the gating means includes a capacitor which charges while the switching means is in the first operating condition and discharges when the switching means is changed from the first operating condition.

4. An apparatus, as set forth in claim 2, including a commutating capacitor connected to the thyristor.

5. An apparatus, as set forth in claim 4, wherein the commutating capacitor charges while the switching means is in the first operating condition.

6. An apparatus, as set forth in claim 1, wherein the main means includes a diode connected to the coil and a selected one of the contacts which creates a path for current flow from the coil to the selected one of the contacts.

7. An apparatus, as set forth in claim 1, wherein the auxiliary means comprises a switching device connected in series with the coil, said switching device conducting through the coil during changing of the switching means from the first operating condition to the second operating condition.

* * * * *